Nov. 12, 1963     DE ROY SIMPSON     3,110,581
EXHAUST FILTER

Filed June 8, 1960     2 Sheets-Sheet 1

DeRoy Simpson
*INVENTOR.*

Nov. 12, 1963  DE ROY SIMPSON  3,110,581
EXHAUST FILTER
Filed June 8, 1960  2 Sheets-Sheet 2
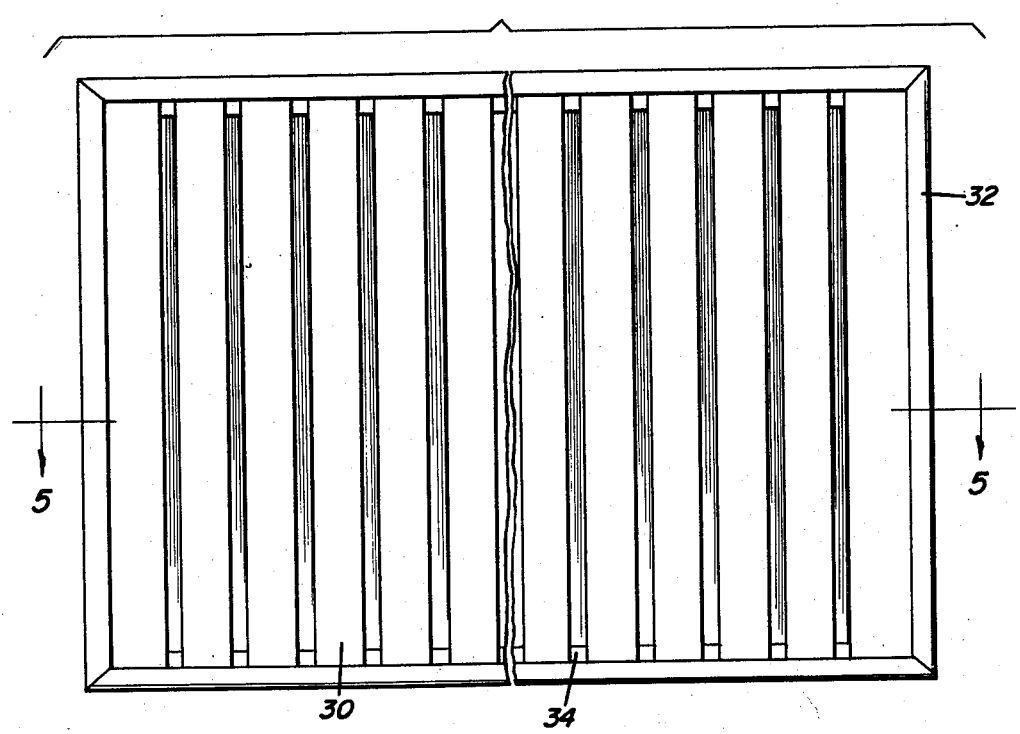
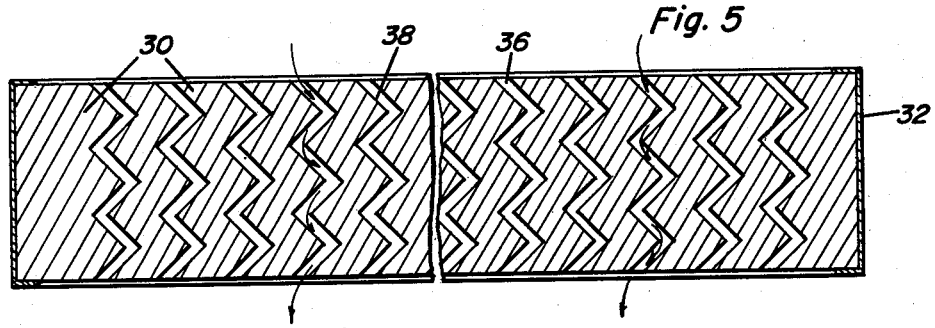
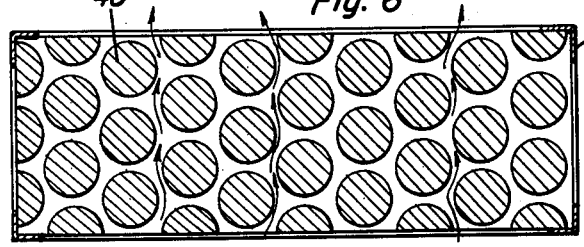
DeRoy Simpson
INVENTOR.

United States Patent Office 3,110,581
Patented Nov. 12, 1963

3,110,581
EXHAUST FILTER
De Roy Simpson, 817 29th St., Oakland, Calif.
Filed June 8, 1960, Ser. No. 34,734
5 Claims. (Cl. 55—387)

This invention relates generally to filter means and more particularly to improved exhaust filter constructions.

Many types of exhaust filters are well known in the prior art. All of the known exhaust filters employing an absorbent material are however constructed so as to utilize loose material. Experience has indicated that the loose material is difficult to retain in place uniformly in the holder. Also, the loose material tends to disintegrate and to deposit dust particles. Moreover, when filters utilizing this material are washed, a considerable amount of the filter material is washed away resulting in wasted material and clogged drains. Still further, it is extremely difficult to install filters employing this loose material.

In view of the above, it is the principal object of this invention to provide novel exhaust filter constructions which are absorbent and rigid and accordingly easy to install and wash.

It is more particularly an object of this invention to provide novel and improved exhaust filter constructions wherein the filter medium defines spaced homogeneous absorbent surfaces that define filter paths. By disposing a plurality of angularly related absorbent filter surfaces on the border of the paths, the exhaust air forced through the passages is buffeted from side to side depositing on the exposed filter surfaces, foreign substances such as grease, food particles, and moisture.

It is a further object of this invention to provide a novel and improved exhaust filter construction utilizing natural or homogeneous absorbent and fire resistant material of rigid design. It is contemplated that materials such as mica or vermiculite, cement and a binding additive, or such be used. Materials of this type can be easily formed, cut, or cast into the desired sizes and shapes.

It is more particularly an object of this invention to provide novel exhaust filter constructions for extracting foreign material by adhesion of solids to the exposed filter surfaces. Moreover, the exposed filter surfaces absorb grease and other soluble substances and also, when placed in proper position, eliminate excess moisture by permitting the excess to drain therefrom. The primary contemplated uses of the exhaust filter constructions are in restaurant and home exhaust systems and over charcoal broilers. Of course, however, many other uses will be readily apparent to those skilled in the art.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an elevational front view of a second form of filter construction;

FIGURE 5 is a horizontal sectional view taken substantially along the plane 5—5 of FIGURE 4; and FIGURE 6 is a transverse sectional view illustrating the construction of a third form of exhaust filter.

Figure 1:
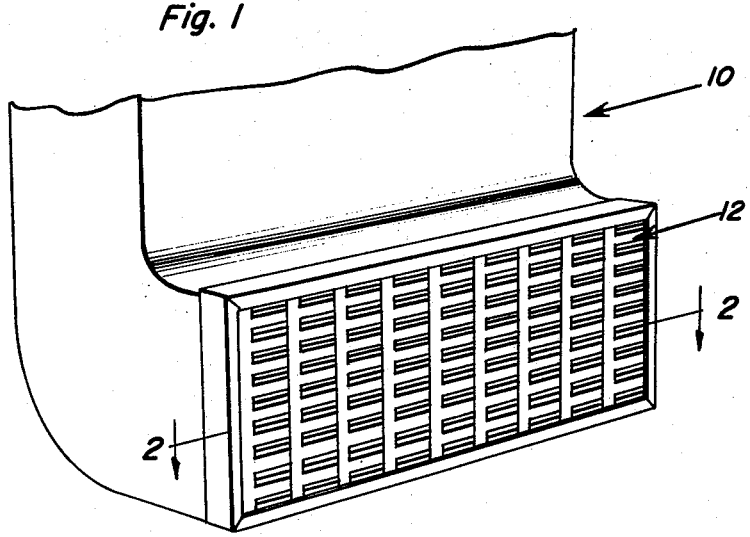
FIGURE 1 is a fragmentary perspective view of a portion of an exhaust system illustrating how the first form of the exhaust filter may be mounted at the opening of a conduit for filtering the exhaust passing therethrough.
Figure 2:
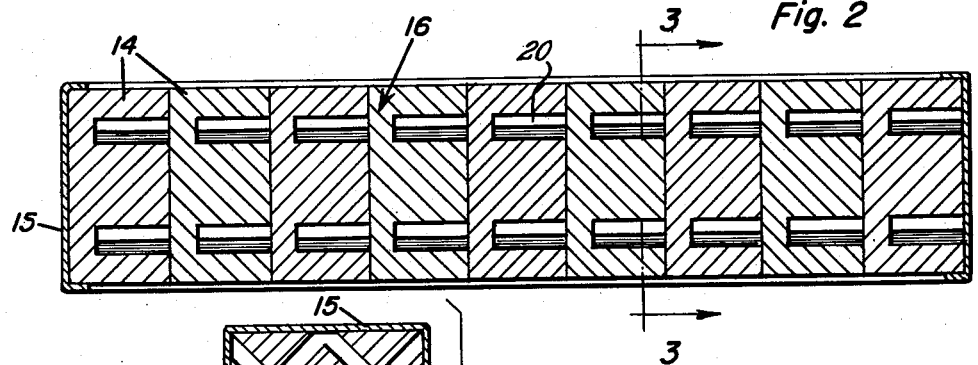
FIGURE 2 is an enlarged sectional view taken substantially along the plane 2—2 of FIGURE 1.
Figure 3:
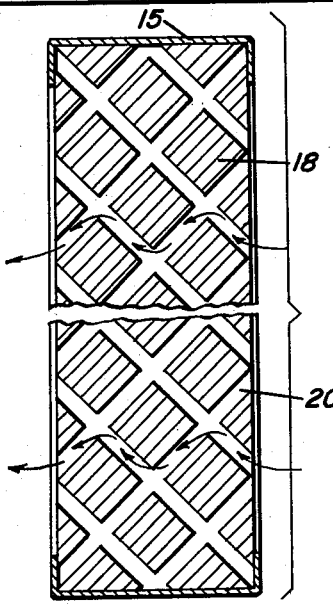
FIGURE 3 is a sectional view taken substantially along the plane 3—3 of FIGURE 2.

With continuing reference to the drawings, special attention is called to the embodiment of the invention illustrated in FIGURES 1 through 3. An exhaust conduit 10 is illustrated defining a front opening. Although the opening and filter constructions illustrated are all rectangular in shape, there is of course no requirement that the filters be rectangular and any size and shape may be utilized. The conduit 10 is primarily utilized in conjunction with forced air systems but may, if desired, be used in gravity ventilation systems also. The initial filter embodiment is generally designated by the numeral 12 and includes a plurality of filter blocks 14 held together in a frame 15. Each of the blocks 14 is of a rigid construction and formed of a natural or homogeneous absorbent and fire-resistant material such as mica, vermiculite, cement and a binding additive, etc. These materials can be easily formed, cut, or cast into the desired sizes and shapes. The particular arrangement shown in FIGURES 1 through 3 including the several blocks assures proper filtration of air passing therethrough.

Each of the blocks 14 defines a solid side wall 16 having cantilevered thereto integrally formed projections 18. The projections 18 are diamond shaped as particularly illustrated in FIGURE 3 with the projections 18 being regularly spaced horizontally and vertically from each other. The spacing between the cantilevered projections 18 defines spaced, tortuous filter passages 20 extending therethrough and as noted in FIGURE 3 the diamond projections 18 define a plurality of angularly related filter surfaces formed of the absorbing material noted which buffet the air entering the passage 20 as indicated by the arrows in FIGURE 3, from surface to surface. The buffeting of the passing air creates a turbulent air movement which in turn causes the air to make better contact with the exposed filter surfaces of the diamond-shaped projections so as to assure the maximum absorption of the foreign material in the air. Inasmuch as the natural or homogeneous material utilized in the formation of the filter blocks is fire-proof, the filters greatly reduce the fire hazard often caused by the deposit of material such as grease and other combustible matter in the duct lines, fans, etc. Moreover, the air movement through the passages 20 materially reduces air contamination and objectionable odors. It will be appreciated that the passages 20 defined between the cantilevered diamond shaped projections 18 intersect at many points so as to assure cross currents and the desired degree of air turbulence.

Attention is now called to the embodiment of the invention illustrated in FIGURES 4 and 5 wherein a plurality of spaced filter blocks 30 are provided. Each of the blocks defines a substantially zig-zag side surface including a plurality of angularly related surfaces. The blocks 30 are received in and secured in a frame 32. Spacers 34 are disposed between the zig-zag side surfaces of adjacent blocks 30 so as to properly space the blocks 30 to define filter passages 36 extending therethrough. Air, as indicated by the arrows in FIGURE 5, enters the passages 36 and is buffeted from surface to surface. In order for the air to move the entire depth of the blocks 30, it must follow the zig-zag shaped passages indicated which of course require that the air be buffeted against the filter surfaces 38. With sufficient buffeting the foreign material in the air is extracted by adhesion of solids to the surfaces 38. Moreover, the blocks 30 absorb grease and other soluble substances. It will be appreciated that the frame 32 extends about the perimter of the several blocks only and the substantial length of the blocks is left open so as to enable it to easily receive a substantial quantity of air therethrough.

Attention is now drawn to the embodiment of FIGURE 6 wherein rod shaped filter members 40 are employed. Again, the filter members 40 are formed of natural or homogeneous absorbent and fire resistant material of rigid construction. The rod shaped members 40 extend parallel to one another but are spaced vertically and horizontally in the frame 42 in which they are secured. The regular spacing of the filter members 40 provides a plurality of air passages through which the air may move as evidenced by the flow arrows indicated in FIGURE 6. It will be appreciated that the air movement therein is such that the air is buffeted from side to side engaging exposed surfaces of the rod-like members 40. The exposed surfaces of the members 40 will absorb the grease and soluble substances in the air and cause the extraction of foreign material by adhesion of solids to the exposed filter surfaces.

The common features of the three filter embodiments will be apparent. The clear improvement of the filters lies in the fact that better filtering is accomplished by a filter device which may be more easily installed and washed. The design of the filter permits a much larger contact surface than does a filter utilizing loose material. The filters herein have absorbing surfaces through their entire thickness, whereas loose material has primarily its exposed surface only. Moreover, these filters, when used in restaurants have a distinct advantage over loose material filters inasmuch as they can be placed in a dishwasher for cleaning. Loose material filters often allow their filter material to be washed away so as to clog drains. Being of a rigid construction, these filters can be used in practically any kind of frame or holder. Filters of loose materials require a complicated, expensive holder to keep the filter material in place and spread evenly, without voids or thin spots.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An exhaust filter assembly for filtering air entrained particles from said air comprising a frame, a series of rigid, preformed, solid, homogeneous, inherently absorbent blocks mounted in said frame, each of said blocks including a solid side wall having integrally formed spaced projections cantilevered therefrom, each block in said series except the first presenting a side wall in abutting relation with the ends of the projections of the preceding block, said spaced projections including a plurality of angularly oriented filter surfaces with respect to said frame and the incoming path of unfiltered air flow defining a plurality of spaced tortuous filter passages therebetween.

2. An exhaust filter assembly according to claim 1, wherein said blocks are unconnected and independently removable.

3. An exhaust filter assembly as defined in claim 1 wherein said projections are diamond shaped in cross-section and are regularly spaced in a vertical and horizontal direction to define a plurality of spaced criss-crossed tortuous air filter passages therebetween.

4. An exhaust filter assembly as defined in claim 1 wherein said blocks are formed of a fire-resistant material.

5. An exhaust filter assembly for filtering air entrained particles from said air comprising a frame, a series of rigid, preformed, solid, homogeneous, inherently absorbent blocks mounted in said frame, each of said blocks including integrally formed spaced projections cantilevered therefrom, said spaced projections including a plurality of angularly oriented filter surfaces with respect to said frame and the incoming path of unfiltered air flow defining a plurality of spaced tortuous filter passages therebetween, said blocks being unconnected and independently removable from said frame.

References Cited in the file of this patent

UNITED STATES PATENTS

| | | |
|---|---|---|
| 248,354 | Schmandt | Oct. 18, 1881 |
| 801,211 | Butyow | Oct. 10, 1905 |
| 1,794,940 | Zimmermann | Mar. 3, 1931 |
| 1,886,927 | Williams | Nov. 8, 1932 |
| 1,919,626 | Finn | July 25, 1933 |
| 1,989,773 | Snow | Feb. 5, 1935 |
| 2,195,563 | Granger | Apr. 2, 1940 |
| 2,926,747 | Wright et al. | Mar. 1, 1960 |

FOREIGN PATENTS

| | | |
|---|---|---|
| 51,955 | Netherlands | Feb. 16, 1942 |
| 281,066 | Germany | Dec. 12, 1914 |
| 1,111,568 | France | Nov. 2, 1955 |